United States Patent [19]
Locke et al.

[11] Patent Number: 5,623,908
[45] Date of Patent: Apr. 29, 1997

[54] ENGINE CONTROLLER WITH AIR METER COMPENSATION DURING ENGINE CRANK

[75] Inventors: Jay C. Locke, Howell; Mark D. LeRoux, Allen Park; Lawrence E. Roman, Garden City, all of Mich.

[73] Assignee: Ford Motor Company, Dearborn, Mich.

[21] Appl. No.: 587,053

[22] Filed: Jan. 16, 1996

[51] Int. Cl.⁶ .................................................. F02M 51/00
[52] U.S. Cl. ........................................................ 123/491
[58] Field of Search .............................. 123/491, 179.16, 123/179.14, 478, 480, 494; 364/431.1, 431.11; 73/118.2

[56] References Cited

U.S. PATENT DOCUMENTS

| | | | |
|---|---|---|---|
| 4,564,907 | 1/1986 | Mouri et al. | 364/431.1 |
| 5,188,082 | 2/1993 | Udo et al. | 123/491 |
| 5,201,217 | 4/1993 | Wachi | 73/118.2 |
| 5,289,809 | 3/1994 | Kamiya et al. | 123/491 |
| 5,408,975 | 4/1995 | Blakeslee et al. | 123/491 |
| 5,492,101 | 2/1996 | Saito et al. | 123/491 |
| 5,515,831 | 5/1996 | Tonekawa | 123/491 |

*Primary Examiner*—Raymond A. Nelli
*Attorney, Agent, or Firm*—Allan J. Lippa; Roger L. May

[57] ABSTRACT

An engine controller compensates for changes in air pressure and intake of the engine during engine crank which are caused by injection of fuel into the intake. The engine controller compares rotational speed of the engine to a threshold value and determines a cylinder air charge value in a first manner if the engine speed is greater than or equal to the threshold value. If the engine speed is less than the threshold value then the reliability of an air meter positioned in the intake is tested and if the air meter is determined to be of sufficient reliability then the cylinder air charge is determined in a second manner. If the air meter is determined to be unreliable then the operability of a throttle position sensor is determined and if the throttle position sensor is determined to be operable then the cylinder air charge is determined in a third manner. If the throttle position sensor is determined to be inoperable then the cylinder air charge is determined in a fourth manner which utilizes a rotational speed of the engine to provide an indication of the effect on the air meter of pressure in the intake caused by injection of fuel into the intake.

18 Claims, 3 Drawing Sheets

5,623,908

1

ENGINE CONTROLLER WITH AIR METER COMPENSATION DURING ENGINE CRANK

FIELD OF THE INVENTION

This invention relates in general to an engine controller and in particular to mechanisms in such controllers for controlling the delivery of fuel to the engine in response to an air meter signal.

BACKGROUND OF THE INVENTION

Internal combustion engines typically employ an air meter positioned in an intake of the engine to generate an air meter signal which is indicative of the mass flow rate of air through the intake. The air meter signal is then used by an engine controller to determine the amount of fuel to be injected into the intake. During engine crank it has been noted that the pressure wave generated by the mass flow of fuel through the fuel injectors into the intake propagates back through the intake during engine cranking and is detected by the air meter as air flow. This perturbance causes misfueling on the rich side. While this phenomena is particularly acute in engines utilizing compressed natural gas it also occurs to a lesser extent in gasoline engines.

SUMMARY OF THE INVENTION

It is accordingly an object of the invention to provide an engine controller which compensates for pressure generated by injection of fuel during engine crank, and which is detected by an air meter, in controlling the amount of fuel delivered to the intake.

In a primary aspect the invention takes the form of an engine controller which includes a means which is responsive to an air meter signal for generating an air flow value which is indicative of the mass flow rate of air through the intake. A means which is responsive to an engine temperature signal generates an engine temperature value indicative of the temperature of the engine. A means which is responsive to an engine speed signal generates an engine speed value which is indicative of the rotational speed of the engine. An aircharge compensation value is then generated in response to the engine temperature and engine speed values. The aircharge width compensation value is indicative of a change in the air flow value due to injection of fuel into the intake during the engine crank mode. A means which is responsive to the aircharge compensation value generates a fuel pulse width value which is indicative of an amount of fuel to be injected into the intake. An amount of fuel which corresponds to the fuel pulse width value is then injected into the intake.

An advantage of certain preferred embodiments, particularly in engines utilizing compressed natural gas, is that pressure generated by injection of the gas into the intake during crank is compensated for by the engine controller thus increasing cold startability and decreasing emissions produced during engine crank.

These and other features and advantages of the present invention may be better understood by considering the following detailed description of a preferred embodiment of the invention. In the course of this description, reference will frequently be made to the attached drawings.

DETAILED DESCRIPTION

Figure 1:
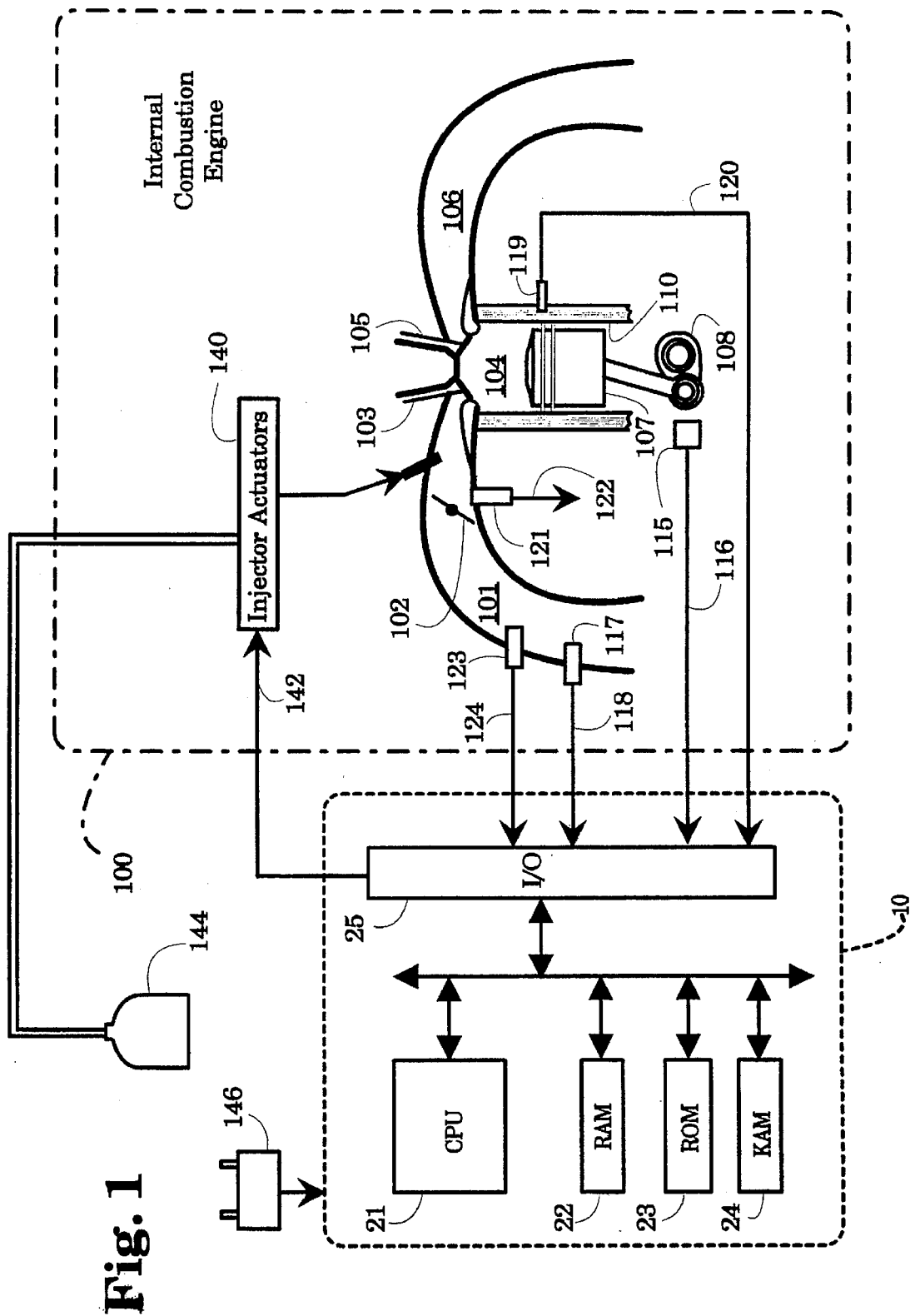
FIG. 1 is a schematic block diagram of an engine and an engine controller which utilizes the principles of the invention.

FIG. 1 of the drawings shows an Electronic Engine Controller (EEC) 10 and an internal combustion engine 100. Engine 100 draws an aircharge through an intake manifold 101, past a throttle plate 102, an intake valve 103 and into combustion chamber 104. An air/fuel mixture which consists of the aircharge and fuel, is ignited in combustion chamber 104, and exhaust gas produced from combustion of the air/fuel mixture is transported past exhaust valve 105 through exhaust manifold 106. A piston 107 is coupled to a crankshaft 108, and moves in a reciprocating fashion within a cylinder defined by cylinder walls 110.

A crankshaft position sensor 115 detects the rotation of crankshaft 108 and transmits a crankshaft position signal 116 to EEC 10. Crankshaft position signal 116 preferably takes the form of a series of pulses, each pulse being caused by the rotation of a predetermined point on the crankshaft past sensor 115. The frequency of pulses on the crankshaft position signal 116 are thus indicative of the rotational speed of the engine crankshaft. A Mass AirFlow (MAF) sensor 117 detects the mass flow rate of air into intake manifold 101 and transmits a representative air meter signal 118 to EEC 10. MAF sensor 117 preferably takes the form of a hot wire air meter. An engine coolant temperature sensor 119 detects the temperature of engine coolant circulating within the engine and transmits an engine coolant temperature signal 120, indicative of said temperature to EEC 10. An air temperature sensor 123 generates an air temperature signal 124 which is indicative of the temperature of air entering intake 101. A throttle position sensor 121 detects the angular position of throttle plate 102 and transmits a representative signal 122 to EEC 10. Throttle position sensor 121 preferably takes the form of a rotary potentiometer. Injector actuators 140 operate in response to fuel pulsewidth signal 142 to deliver an amount of fuel determined by fuel injector signal 142 to combustion chambers 104 of the engine. Injector actuators 140 recive fuel from a fuel tank 144 which in a preferred embodiment stores compressed natural gas. Battery 146 supplies electrical energy to the EEC 10 and other engine components. EEC 10 monitors the battery voltage and generates a battery low value if battery voltage falls below a predetermined value, for use by control programs executed by the EEC for controlling various engine functions.

EEC 10 includes a central processing unit (CPU) 21 for executing stored control programs, a random-access memory (RAM) 22 for temporary data storage, a read-only memory (ROM) 23 for storing the control programs, a keep-alive-memory (KAM) 24 for storing learned values, a conventional data bus, and I/O ports 25 for transmitting and receiving signals to and from the engine 100 and other systems in the vehicle.

Figure 2:
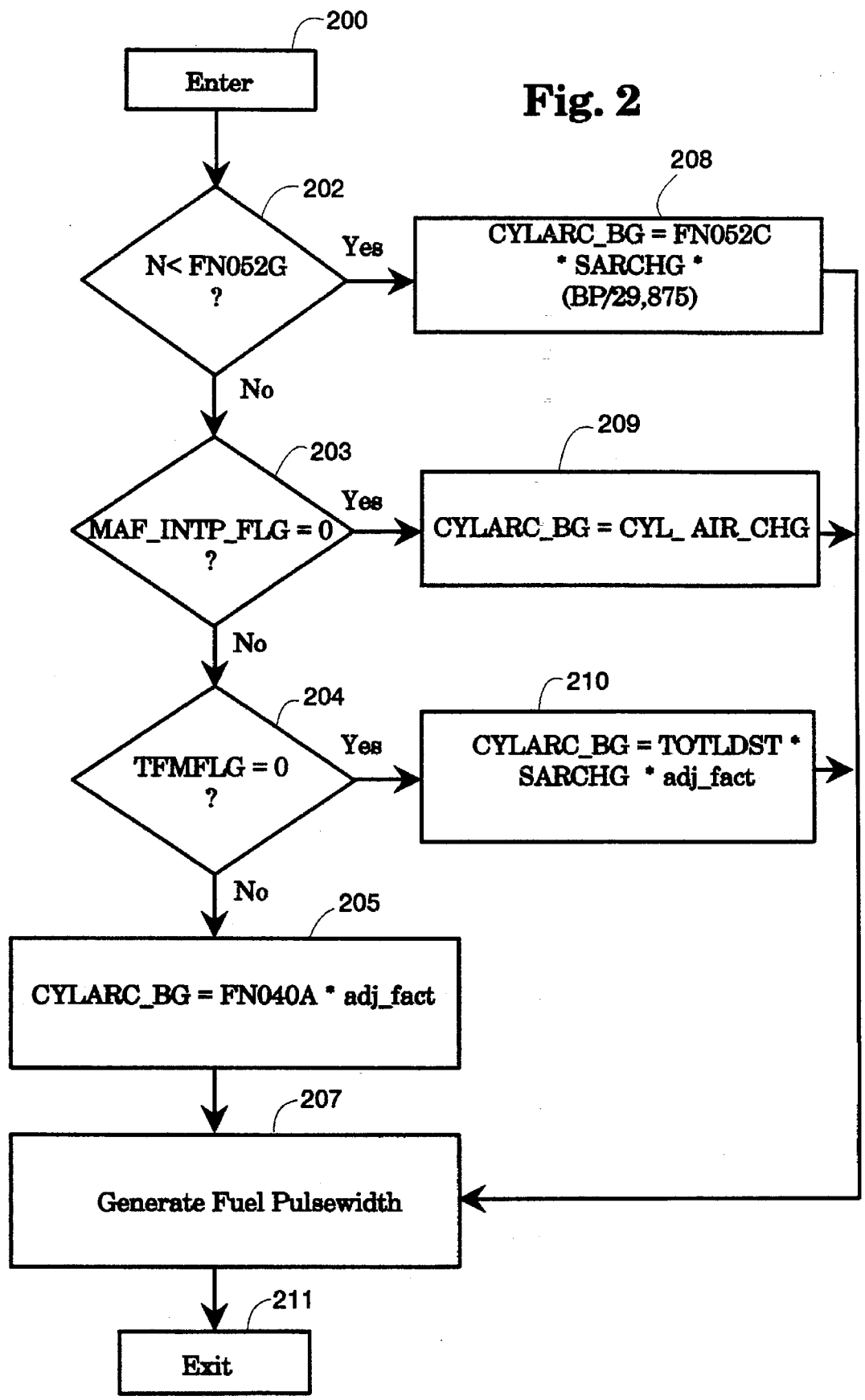
FIG. 2 is a flow chart showing the operation of a preferred embodiment.

A preferred embodiment advantageously generates the fuel pulse width signal in a manner to compensate for pressure caused by injection of fuel into the intake during engine crank. FIG. 2 of the drawings is a flow chart showing the steps taken by a preferred embodiment to generate an aircharge value which compensates for the aforesaid phenomena. Steps shown in FIG. 2 are preferably executed by the microprocessor as part of the background routine. Specifically, FIG. 2 shows the steps of an air meter compensation routine. In FIG. 2 the air meter compensation routine is entered at 200 and at 202, an engine speed value N which is indicative of the rotational speed of the engine is compare to an engine speed threshold value. The engine speed threshold value is preferably generated by retrieving the value from a table FN052G which contains a plurality of engine speed threshold values indexed by engine speed and engine coolant temperature, as represented by the engine coolant temperature signal. If the engine speed value N is less than the engine speed threshold value at 202 then at 203 and 204 checks are made respectively to determine the reliability of the air meter signal and the operability of the throttle plate position sensor. At 203 a flag MAF_INTP_FLAG is checked. The flag MAF_INTP_FLAG indicates, if it has a value of one, that the air meter signal is unreliable. If it has a value of zero the air meter is considered to be reliable. If at 203 the air meter signal is considered to be unreliable then at 204 the operability of the throttle position sensor is checked by testing the value of flag TFMFLAG, if TFMFLAG is equal to zero then the throttle position sensor is determined to be reliable. If TFMFLAG is equal to one then the routine proceeds to step 205, where the aircharge compensation value CYLARC_BG is determined by accessing a first value from a table FN040A and multiplying that value by an adjustment factor adj_fact which accounts for variations in air charge temperature, engine coolant temperature and barometric pressure. The table FN040A is preferably a one-dimensional table containing a plurality of values which are indexed by engine speed. Each of the values contained in the table is empirically determined and represents cylinder air charge in pounds minute per intake stroke. Once the aircharge compensation value is generated at 205, the routine proceeds to step 207 where a fuel pulse width value is generated in accordance with the aircharge compensation value. The routine then exits at step 208.

If at step 202 the engine speed value N is greater than or equal to the engine speed threshold value, then at 208 the aircharge compensation value is CYLARC_BG, is calculated as a function of a value retrieved from a table FN052C, a standard air charge value SARCHG which is indicative of standard air charge in pounds minute per intake stroke, and barometric pressure BP as adjusted by standard barometric pressure at sea level (29,875). The values contained in table FN052C are empirically determined air charge values for cylinder air charge during engine crank. The table FN052C is indexed by engine coolant temperature. The value SARCHG is determined by the engine controller by the following formula: $(4.4256 \times 10^5) \times$ (engine size in cubic inches divided by the number of cylinders.)

If at 203 the air meter signal is determined to be of sufficient reliability, then at 209 the value CYLARC_BG is set equal to a value of CYL_AIR_CHG which is indicative of an aircharge corresponding to the mass flow rate of air detected by the air meter. If at step 204 the throttle position sensor is determined to be operative then at step 210 the value CYLARC_BG is generated as a function of a value TOTLDST which is indicative of total throttle base load and normalized air charge. Values SARCHG and adj_fact are as explained above.

Figure 3:
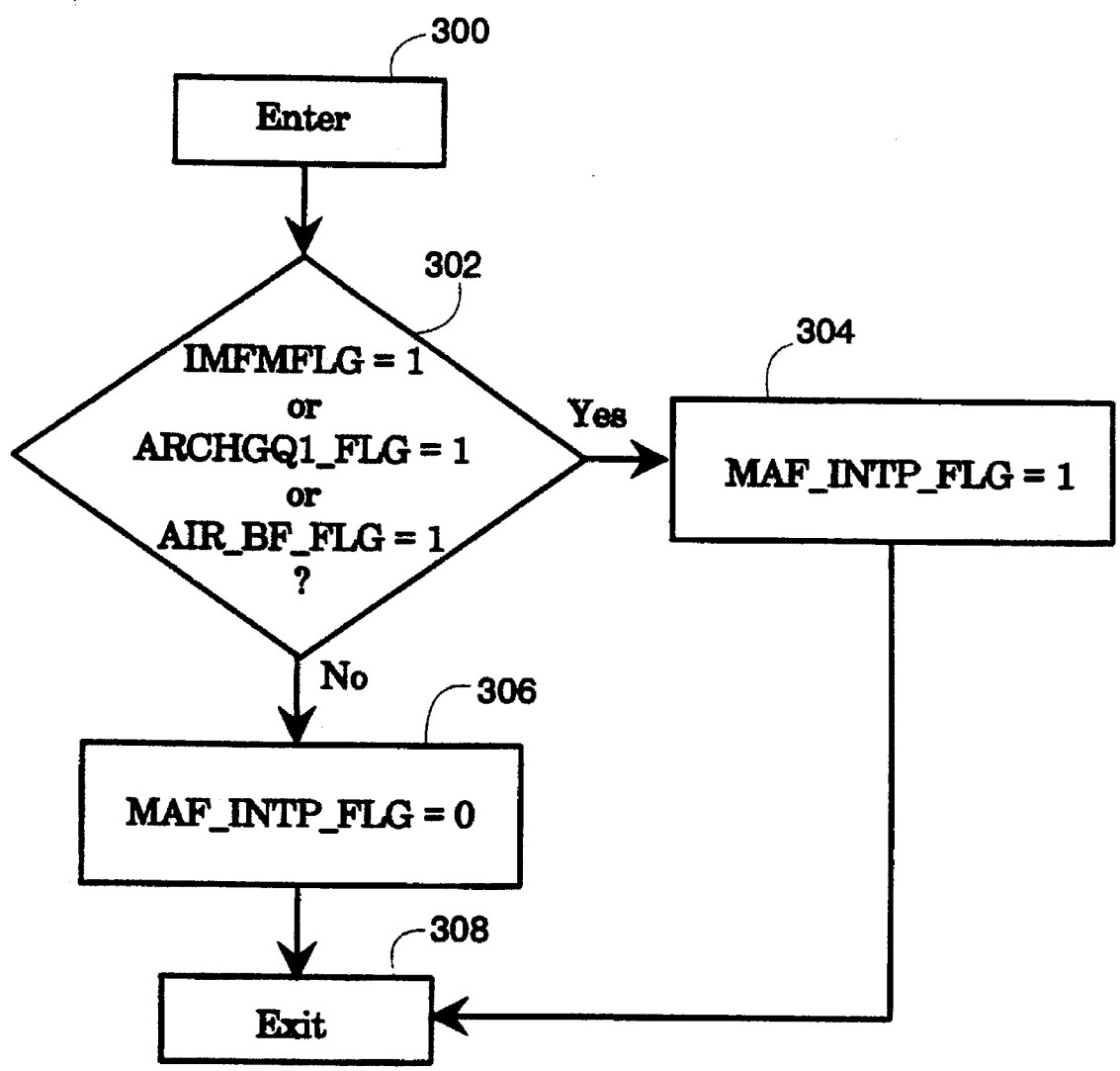
FIG. 3 is a flow chart showing the operation of a portion of FIG. 2 in greater detail.

FIG. 3 of the drawings shows the generation of the value MAF_INTP_FLG which indicates the reliability of the air meter. Three flags are tested at 302, IMFNFLG, ARCHGQ1_FLG and AIR_BF_FLG. IMFNFLG is a flag which when set to a value of one indicates that the air meter has failed. ARCHGQ1_FLG is a flag which when set to a value of one indicates that the battery voltage is below a predetermined level. AIR_BF_FLG when set to a value of one indicates that the engine is operating in an empirically determined backflow region of operation in which pressure generated by a rising piston creates a pressure wave that propogates back through the induction system, thus causing an erroneous meter reading. If either of the flags at step 302 are determined to be one then at step 304 the air meter signal is determined to be unreliable and the value CYLARC_BG is determined as described above at step 205. Otherwise, at step 306 the flag MAF_INTP_FLG is set to a value of zero to indicate that the air meter signal is reliable. In this event the value CYLARC_BG is determined as seen at step 209.

The battery voltage flag ARCHGQ2_FLG is set to a value of one if the battery voltage is below a predetermined threshold and if the engine is not in crank or underspeed mode.

It is to be understood that the specific mechanisms and techniques which have been described are merely illustrative of one application of the principles of the invention. For instance, though the embodiment described above employs compressed natural gas, the principles of the present invention are also applicable to engines utilizing other types of fuel, including gasoline. Numerous other modifications may be made to the methods and apparatus described without departing from the true spirit and scope of the invention.

What is claimed is:

1. An engine controller for controlling delivery of fuel to an intake of an engine during engine crank comprising:

means, responsive to an air meter signal, for generating an air flow value indicative of the mass flow rate of air through said intake;

means, responsive to an engine temperature signal, for generating an engine temperature value indicative of the temperature of said engine;

means, responsive to an engine speed signal, for generating an engine speed value, indicative of the rotational speed of said engine;

means, responsive to said engine temperature value and to said engine speed value for generating a compensated aircharge value, indicative of a change in said air flow value due to injection of fuel into said intake during said engine crank;

means, responsive to said compensated aircharge value for generating a fuel pulsewidth value, indicative of an amount of fuel to be injected into said intake; and means for causing injection of an amount of fuel into said intake corresponding to said fuel pulsewidth value.

2. An engine controller as set forth in claim 1 wherein said means for generating a compensated aircharge value comprises:

means for generating an engine speed threshold value as a function of said engine speed value and said engine temperature value;

means for comparing said engine speed value to said engine speed threshold value;

means, responsive to said engine speed value being less than said engine speed threshold value for generating an air meter signal indicative of the reliability of said air meter signal reliability value as a function of at least a first engine operating condition;

said means for generating a compensated aircharge value generating said value if said air meter signal reliability value indicates an unreliable air meter signal.

3. An engine controller as set forth in claim 2 wherein said means for generating an engine speed threshold value comprises means for retrieving said engine speed threshold value from a table comprising a plurality of engine speed threshold values which are indexed by engine speed and engine temperature.

4. An engine controller as set forth in claim 3 wherein said first engine operating condition is an air meter fail value indicative of the operability of said air meter.

5. An engine controller as set forth in claim 3 wherein the air meter signal reliability value is indicative of the reliability of said air meter signal as a function of a plurality of engine operating conditions comprising an air meter fail value, indicative of the operability of said air meter, a battery voltage value, indicative of battery voltage above threshold voltage, and an air backflow flag, indicative of engine operation in an air backflow region.

6. An engine controller as set forth in claim 5 further comprising a means for determining the operability of a throttle position sensor and wherein said means for generating said compensated aircharge value generates said value only if said throttle position sensor is inoperable.

7. An engine controller as set forth in claim 6 wherein said means for generating a compensated aircharge value generates said value by retrieving said value from a table containing a plurality of said values which are indexed by engine speed.

8. An engine controller as set forth in claim 1 further comprising a means for determining the operability of a throttle position sensor and wherein said means for generating said compensated aircharge value generates said value only if said throttle position sensor is inoperable.

9. An engine controller as set forth in claim 1 wherein said means for generating a compensated aircharge value generates said value by retrieving said value from a table containing a plurality of said values which are indexed by engine speed.

10. Apparatus for controlling the delivery of compressed natural gas to an intake of an internal combustion engine during engine crank comprising:
    means, responsive to an air meter signal, for generating an air flow value indicative of the mass flow rate of air through said intake;
    means, responsive to an engine temperature signal, for generating an engine temperature value indicative of the temperature of said engine;
    means, responsive to an engine speed signal, for generating an engine speed value, indicative of the rotational speed of said engine;
    means responsive to an air meter unreliability value for generating an aircharge compensation value as a function of said engine temperature value and said engine speed value, said aircharge compensation value indicative of a change in said air flow value due to injection of said compressed natural gas into said intake during said engine crank;
    means, responsive to said aircharge compensation value for generating a fuel pulsewidth value, indicative of an amount of fuel to be injected into said intake; and
    means for causing injection of an amount of fuel into said intake corresponding to said fuel pulsewidth value.

11. Apparatus as set forth in claim 10 wherein said means for generating an aircharge compensation value comprises:
    means for generating an engine speed threshold value as a function of said engine speed value and said engine temperature value;
    means for comparing said engine speed value to said engine speed threshold value;
    means, responsive to said engine speed value being less than said engine speed threshold value for generating an air meter signal indicative of the reliability of said air meter signal as a function of at least a first engine operating condition;
    said means for generating an aircharge compensation value generating said value if said air meter signal reliability value indicates an unreliable air meter signal.

12. Apparatus as set forth in claim 11 wherein said means for generating an engine speed threshold value comprises means for retrieving said engine speed threshold value from a table comprising a plurality of engine speed threshold values which are indexed by engine speed and engine temperature.

13. Apparatus as set forth in claim 12 wherein the air meter signal reliability value is indicative of the reliability of said air meter signal as a function of a plurality of engine operating conditions comprising an air meter fail value, indicative of the operability of said air meter, a battery voltage value, indicative of battery voltage above threshold voltage, and an air backflow flag, indicative of engine operation in an air backflow region.

14. Apparatus as set forth in claim 13 further comprising a means for determining the operability of a throttle position sensor and wherein said means for generating said aircharge compensation value generates said value only if said throttle position sensor is inoperable.

15. Apparatus as set forth in claim 14 wherein said means for generating an aircharge compensation value generates said value by retrieving said value from a table containing a plurality of said values which are indexed by engine speed.

16. Apparatus for controlling the delivery of compressed natural gas to an intake of an internal combustion engine during engine crank comprising:
    an air meter which is positioned in said intake and which generates an air meter signal indicative of the mass flow rate of air through said intake;
    an engine coolant temperature sensor for generating an engine coolant temperature signal indicative of the temperature of engine coolant circulating in said engine;
    means for generating an engine speed signal indicative of the rotational speed of said engine;
    a microprocessor responsive to said air meter signal, said engine coolant temperature signal and said engine speed signal, said microprocessor programmed to,
        retrieve, as a function of said engine speed signal and said engine coolant temperature signal, a threshold engine speed value,
        compare an actual engine speed value which corresponds to said engine speed signal, to said threshold engine speed value;
        respond to said actual engine speed value being less than said threshold engine speed value by generating an aircharge compensation value, indicative of an amount to change a fuel pulsewidth signal to compensate for a change in air pressure in said intake due to injection of said compressed natural gas in said intake;
        generate said fuel pulsewidth signal as a function of said aircharge compensation value; and
    means for causing injection of an amount of compressed natural gas into said intake in accordance with said fuel pulsewidth signal.

17. Apparatus as set forth in claim 16 wherein the microprocessor is programmed to determine the reliability of said air meter signal and is further programmed to generate said aircharge compensation value if said air meter is determined to be reliable in accordance with a plurality of predetermined factors.

18. Apparatus as set forth in claim 17 wherein the microprocessor generates said aircharge compensation value by retrieving said value from a table containing a plurality of said values which are indexed by engine speed.

* * * * *